Oct. 25, 1960     O. LOTZ     2,957,436
CYCLONE FURNACES
Filed May 23, 1955     2 Sheets-Sheet 1

INVENTOR.
OTTO LOTZ
BY
ATTORNEY

INVENTOR.
OTTO LOTZ
BY
ATTORNEY

United States Patent Office 2,957,436
Patented Oct. 25, 1960

2,957,436

CYCLONE FURNACES

Otto Lotz, Oberhausen, Rhineland, Germany, assignor to The Babcock & Wilcox Company, New York, N.Y., a corporation of New Jersey Filed May 23, 1955, Ser. No. 510,332
In Germany Apr. 9, 1949

Public Law 619, Aug. 23, 1954
Patent expires Apr. 9, 1969

7 Claims. (Cl. 110—28)

The present invention relates to the construction and operation of cyclone furnaces for burning particle-form slag-forming solid fuel at furnace chamber temperatures above the ash fusion temperature to thereby permit the removal of the incombustible ash residue from the furnace chamber as a liquid slag, and more particularly to furnaces of the character described in which the gaseous products of combustion are discharged from the furnace chamber through a restricted gas outlet.

The granular fuels normally used in such furnaces have particle sizes of ⅜" and under, and contain as a result of the fuel crushing operation a proportion of dust-like particles, known as "fines." The fuel and air mixture is introduced in the combustion chamber through a tangential inlet arranged to effect a whirling motion of the fuel and air mixture in a helical path axially of and toward the opposite end of the furnace. In operation the entering fuel and air stream is rapidly ignited and the centrifugal effect of the whirling stream causes the ash particles released from the burning fuel particles to deposit in a molten condition on the furnace wall and form a film or layer of molten slag thereon on which the larger fuel particles are caught and burned in place.

If the super-atmospheric pressure of the air supply to a cyclone furnace were a few tenths of an inch of water, the column of fuel in the fuel supply duct leading to the cyclone furnace would generally serve to seal the duct. Actually, however, a cyclone furnace is operated with preheated combustion air supplied at high pressure, which may amount to 20 to 80 inches of water, according to the load. At such pressures great difficulty arises in providing a reliable seal and fuel ignition in the bunker may be caused by infiltration of the hot high pressure air.

The present invention avoids the foregoing difficulty by providing sealing means which effectively check infiltration of the hot high pressure combustion air into the fuel bunker. In particular, the present invention provides combustion air supply means including an air duct of converging cross-section disposed substantially tangentially with respect to means forming a fuel and combustion air whirl chamber and a fuel supply duct arranged for the gravitational introduction of particle-form slag-forming fuel into the air duct and opening into the converging portion of the air duct, preferably at an acute angle to the axis of flow and at the narrowest cross-section thereof. The air duct is convergently arranged in order to decrease the pressure of the air flowing therethrough and thereby transform some of its static pressure into velocity pressure, preferably reaching a minimum static pressure value at the fuel supply duct opening into the air duct. As the air passes the fuel supply opening, a suction is produced in the fuel supply duct, i.e. the static pressure in the air supply duct at a location adjacent the fuel supply opening is less than the pressure prevailing in the fuel supply duct or the pressure applied to the fuel duct is limited to a relatively small value, thus preventing or limiting the discharge of air into the fuel bunker.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 1:
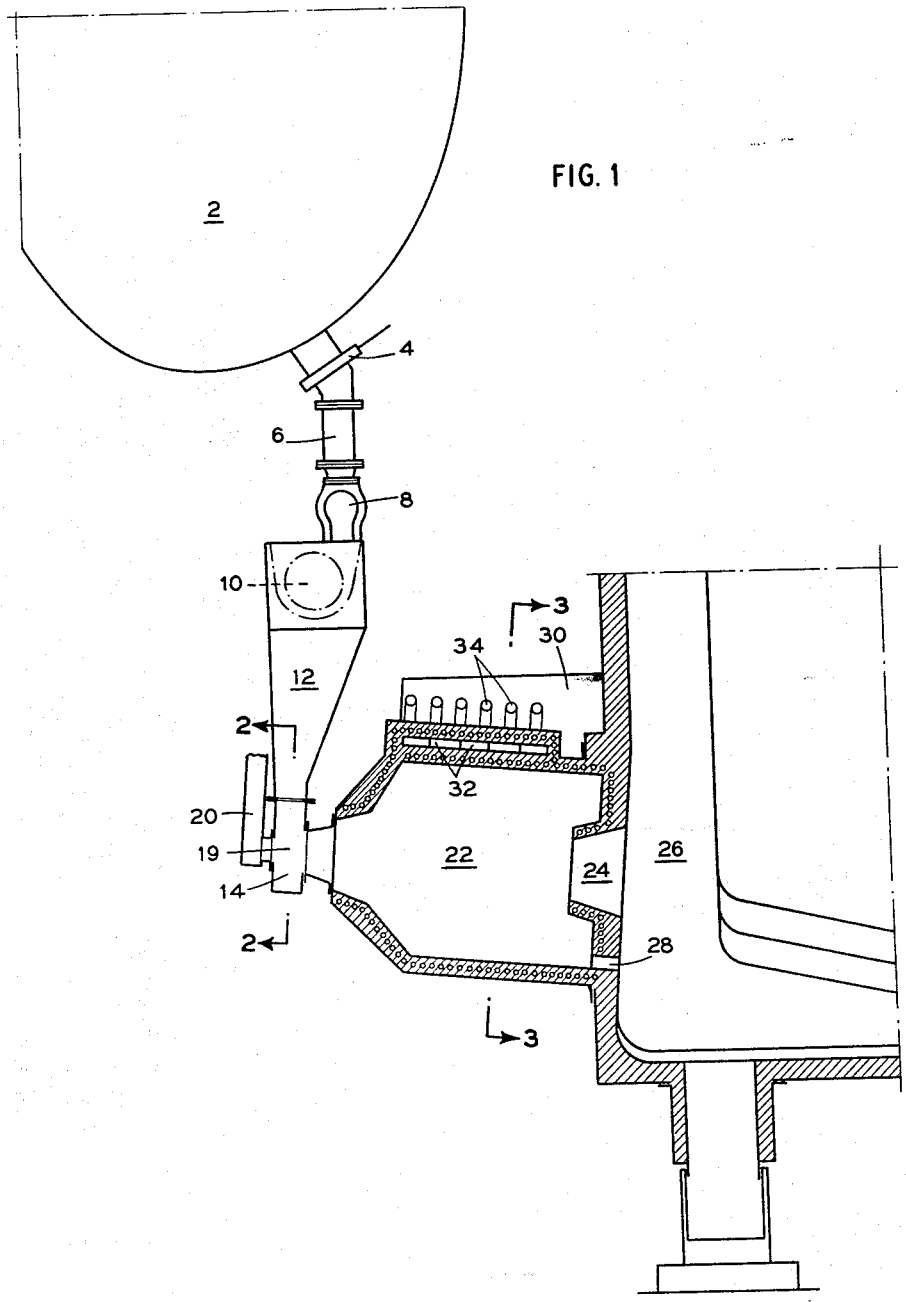
Fig. 1 is a somewhat diagrammatic sectional elevation of a horizontally arranged cyclone furnace constructed in accordance with my invention, and the adjacent portion of an associated water tube steam boiler.
Figure 2:
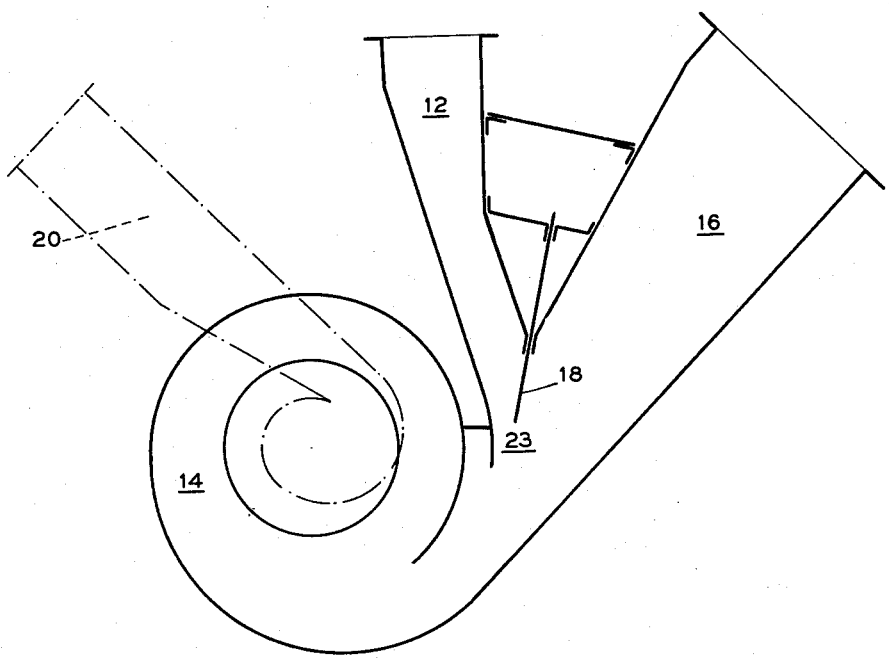
Fig. 2 is a sectional front elevation of a burner for the cyclone furnace taken on the line 2—2 of Fig. 1.

In Fig. 1, the raw fuel is supplied from a bunker 2 through a slide valve 4 for shutting off the fuel and a duct 6 to a feeder 8, which feeds the fuel to a crusher 10 discharging to a fuel supply duct 12. The lower part of the fuel supply duct 12 is formed as a nozzle shaped fuel supply means for the burner 14 and the duct 12 and a primary air supply duct 16, the end of which is formed as a nozzle shaped air supply means for the burner, converge to a confluence, the fuel supply means and the air supply means being relatively arranged to have the air supply duct exert an ejector effect on the lower end of the fuel supply duct. The nozzle shaped end of the duct 16, is tangentially disposed in relation to the scroll shaped peripheral wall of a whirl chamber forming part of the burner 14. A sliding plate 18 forming a division wall between the fuel supply duct 12 and the primary air supply duct 16 may be moved upwardly or downwardly in order to regulate the ejector or suction effect on the fuel supply duct.

Outwardly of and co-axial, and in communication with, the whirl chamber of the burner 14 is an auxiliary whirl chamber 19 of relatively small diameter fitted at its outer end with an inspection port. Opening tangentially into the auxiliary whirl chamber 19 is an air duct 20. The air supplied through the duct 20 serves to create a partial vacuum, which enables the inspection port to be opened without the discharge of flame or hot gases through the port.

The substantially cylindrical, refractory walled combustion chamber 22 is formed with a co-axial outwardly flaring gas outlet throat 24 leading to a boiler radiation space 26, towards which the combustion chamber is downwardly inclined at a small angle towards a slag opening 28.

Figure 3:
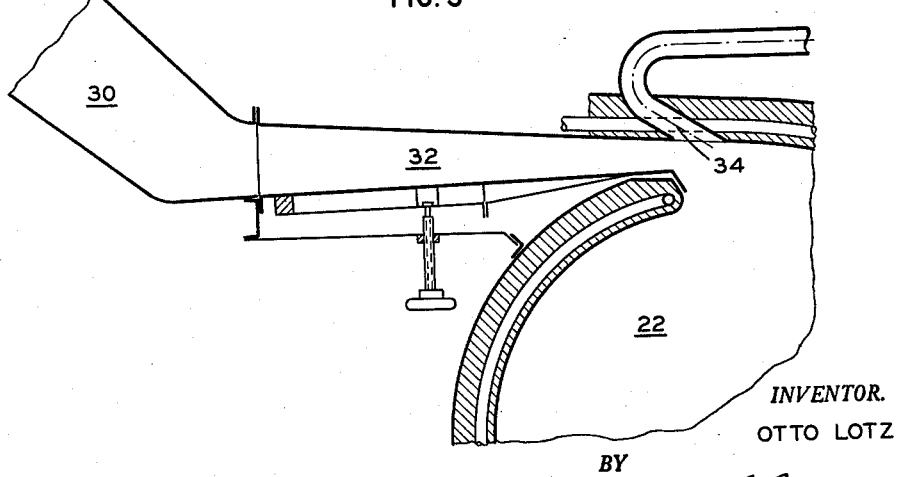
Fig. 3 is a fragmentary sectional front elevation of a cyclone furnace taken on the line 3—3 of Fig. 1.

A secondary air duct 30 connects with nozzles 32 communicating tangentially with the combustion chamber 22 as shown in Fig. 3. The nozzles 32 and auxiliary fuel inlets 34 are also arranged after the manner of an ejector, the auxiliary fuel inlets 34 preferably having an axis of flow forming an acute angle with the axis of flow of the nozzles 32 and being disposed radially outwards with respect to the nozzles 32 and slightly forward thereof in the direction of whirl. The nozzles 32 are introduced between the ends of circularly bent cooling tube lengths surrounding the combustion chamber and the auxiliary fuel inlets 34 are introduced between the neighboring tube lengths.

During operation, fuel supplied from the bunker 2 and crushed by the crusher 10 is supplied to the fuel supply duct 12, while primary air at substantial pressure is supplied through the pirmary air duct 16. As the primary air flows through the converging portion of the air duct 16, its velocity pressure increases and its static pressure decreases. The fuel supply duct 12 opening into the primary air duct 16 is preferably located at the narrowest cross-section thereof where the primary air static pressure is at a minimum. With this arrangement, the low primary air static pressure adjacent the fuel supply duct opening causes a suction to be created in the fuel supply duct 12 or the pressure applied to the duct 12 is limited to a relatively small value.

The scroll shaped surface of the burner 14 causes the primary air and fuel mixture to rotate, with the result that it enters the combustion chamber with a strong whirl and moves helically along its peripheral wall while combustion takes place. Secondary air is supplied through the nozzles 32. The hot gases pass through the outlet throat 24 to the radiation space 26 and the molten slag runs down the walls of the combustion chamber and out of the slag opening 28.

In order to start up or to maintain the cyclone furnace at partial load, suitable fuel more readily ignited and burned than granular fuel may be supplied to the nozzles 34. Thus combustible gas, or a mixture of pulverized fuel and air may be supplied to the nozzles 34. During such operation, the air stream from the nozzles 32 tends to press the fuel streams from the nozzles 34 against the refractory wall of the combustion chamber, so that the wall is strongly heated. The air issuing from the nozzles 32, moreover, exerts a suction effect in the nozzles 34. As the secondary air enters the converging section of duct 32, its velocity pressure begins to increase, reaching a maximum value at the air inlet to the combustion chamber 22. The action of the high velocity secondary air adjacent the auxiliary fuel nozzles 34 creates a low static pressure at this location and thus reduces considerably the combustion chamber pressure head that must be overcome by auxiliary fuel delivery equipment.

If desired, nozzles 34 may also be used in continuous operation for working with fine particles such as fly ash or grits, from fuel supplied to another furnace or other furnaces, the slag from the particles being deposited in molten form on the wall of the combustion chamber 22 since the mean average temperature in the chamber is normally above the fuel ash fusion temperature.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. The process of burning and melting fly ash which comprises introducing a stream of air and slag-forming particle fuel in suspension at a high velocity into a combustion chamber of substantially circular cross-section so as to move at a high velocity along the circumferential wall thereof, introducing a stream of fly ash into said combustion chamber so as to move in a whirling path of travel along and adjacent to the circumferential wall thereof while maintaining a normal mean temperature in the chamber above the fuel ash and fly ash fusion temperatures, causing the fuel and air and fly ash so introduced to move axially of the combustion chamber towards the gas discharge end thereof through a helical path of travel along the circumferential wall of the combustion chamber of sufficient length to cause combustion of the fuel and release of fuel ash in a condition to form a sticky surface on the circumferential wall to which fuel particles and fly ash particles adhere and are scrubbed by the combustion gases, causing the furnace gases to discharge from said end of the combustion chamber, and collecting and withdrawing the ash separated in the combustion chamber and fly ash in a molten condition from the lower part of the chamber.

2. The process of burning and melting fly ash which comprises introducing a stream of air and slag-forming particle fuel in suspension at a high velocity into a combustion chamber of substantially circular cross-section so as to move at a high velocity along the circumferential wall thereof, introducing a stream of fly ash tangentially into said combustion chamber so as to move in a whirling path of travel along and adjacent to the circumferential wall thereof while maintaining a normal mean temperature in the chamber above the fuel ash and fly ash fusion temperatures, causing the fuel and air and fly ash so introduced to move axially of the combustion chamber towards the gas discharge end thereof through a helical path of travel along the circumferential wall of the combustion chamber of sufficient length to cause combustion of the fuel and the release of fuel ash in a condition to form a sticky surface on the circumferential wall to which fuel particles and fly ash particles adhere and are scrubbed by the combustion gases, causing the furnace gases to be deflected at the gas discharge end of the combustion chamber inwardly towards the axis of the chamber and to discharge from said end of the combustion chamber at a high velocity, and collecting and withdrawing the ash separated in the combustion chamber and fly ash in a molten condition from the lower part of the chamber adjacent the gas outlet.

3. The process of burning and melting fly ash which comprises introducing a stream of air and slag-forming particle fuel in suspension at a high velocity into one end of a combustion chamber of substantially circular cross-section arranged with its axis substantially horizontal, introducing a stream of fly ash into said combustion chamber tangentially to the circumferential wall thereof so as to move in a whirling path of travel along and adjacent to the circumferential wall while maintaining a normal mean temperature in the chamber above the fuel ash and fly ash fusion temperatures, causing the fuel and air and fly ash so introduced to move axially of the combustion chamber towards the gas discharge end thereof through a helical path of travel along the circumferential wall of the combustion chamber of sufficient length to cause combustion of the fuel and the release of fuel ash in a condition to form a sticky surface on the circumferential wall to which fuel particles and fly ash particles adhere and are scrubbed by the combustion gases, causing the furnace gases to discharge from said end of the combustion chamber, and collecting and withdrawing the ash separated in the combustion chamber and fly ash in a molten condition from the lower part of the chamber adjacent the gas outlet.

4. A cyclone furnace having walls including fluid cooled tubes forming a combustion chamber of substantially circular cross-section, means forming a restricted gas outlet at one end of said combustion chamber, means for introducing a whirling stream of combustion air and slag-forming particle fuel in suspension at a high velocity into said combustion chamber and effecting a helical path of travel therein along the circumferential wall of said combustion chamber, said last named means including an air supply duct and a fuel supply duct disposed outwardly of said air duct and arranged for the gravitational introduction of slag-forming particle fuel into said air supply duct, said air duct having a discharge portion of gradually decreasing cross-sectional area in the direction of flow arranged with its axis of flow at a sharply acute angle to the axis of flow of said fuel duct and opening to the discharge end of said fuel duct to exert an ejector effect on said fuel duct and thereby minimize the back pressure on the fuel duct, and a slidable plate forming a common wall between said fuel duct and air duct and movable to regulate the suction effect of the high velocity air flowing through said air duct on said fuel duct.

5. A cyclone furnace having walls including fluid cooled tubes forming a combustion chamber of substantially circular cross-section, means forming a restricted gas outlet at one end of said combustion chamber, means forming a fuel and combustion air whirl chamber of smaller cross-sectional area than and opening to the opposite end of said chamber, means for introducing a whirling stream of combustion air and slag-forming particle fuel in suspension at a high velocity into said whirl chamber and effecting a helical path of travel therein and along the circumferential wall of said combustion chamber, said last named means including an air supply duct opening tangentially into said whirl chamber and a fuel supply duct disposed outwardly of said air duct and arranged for the gravitational introduction of slag-forming particle fuel into said air supply duct, said air duct having a discharge portion of gradually decreasing cross-sectional area in the direction of flow arranged with its axis of flow at a sharply acute angle to the axis of flow of said fuel duct and opening at its minimum cross-section to the discharge end of said fuel duct to exert an ejector effect on said fuel duct and thereby minimize the back pressure on the fuel duct, and a slidable plate forming a common wall between said fuel duct and air duct and movable to regulate the suction effect of the high velocity air flowing through said air duct on said fuel duct.

6. A cyclone furnace comprising wall means forming an elongated combustion chamber of circular transverse cross-section having a gas outlet throat in one end thereof, means forming a fuel and primary air whirl chamber of smaller diameter than and opening into the other end of said combustion chamber, primary air supply means including an air duct of converging cross-section in the direction of flow for increasing the velocity of the air disposed substantially tangentially with respect to said whirl chamber, a fuel supply duct disposed outwardly of and opening to the converging portion of said primary air duct and arranged for the gravitational introduction of particle-form-slag-forming fuel into said primary air duct, said fuel supply duct having an axis of flow forming an acute angle with the axis of flow of the converging portion of said primary air duct, a vertically slidable plate forming a common inclined wall between said fuel supply duct and said primary air duct and movable to regulate the suction effect of the high velocity primary air on said fuel supply duct, a series of convergent type secondary air supply nozzles arranged to tangentially introduce streams of secondary combustion air into said combustion chamber at a location between said whirl chamber and said gas outlet, auxiliary fuel inlets disposed outwardly of and opening to said secondary air supply nozzles adjacent said combustion chamber, said auxiliary fuel inlets having an axis of flow forming an acute angle with the axis of flow of said secondary air supply nozzles.

7. A cyclone furnace comprising wall means forming an elongated combustion chamber of circular transverse cross-section having a gas outlet throat in one end thereof, means forming a fuel and primary air whirl chamber of smaller diameter than and opening into the other end of said combustion chamber, primary air supply means including an air duct of converging cross-section in the direction of flow for increasing the velocity of the air disposed substantially tangentially with respect to said whirl chamber, a fuel supply duct disposed outwardly of and opening to the converging portion of said primary air duct at the narrowest cross-section thereof and arranged for the gravitational introduction of particle-form slag-forming fuel into said primary air duct, said fuel supply duct having an axis of flow forming an acute angle with the axis of flow of the converging portion of said primary air duct, a vertically slidable plate forming a common inclined wall between said fuel supply duct and said primary air duct and movable to regulate the suction effect of the high velocity primary air on said fuel supply duct, a series of convergent type secondary air supply nozzles arranged to tangentially introduce streams of secondary combustion air into said combustion chamber at a location between said whirl chamber and said gas outlet, auxiliary fuel inlets disposed outwardly of and opening to said secondary air supply nozzles at the narrowest cross-section thereof and abutting said combustion chamber, said auxiliary fuel inlets having an axis of flow forming an acute angle with the axis of flow of said secondary air supply nozzles and being disposed radially outward with respect to said secondary air supply nozzles.

References Cited in the file of this patent

UNITED STATES PATENTS

| 1,535,903 | Bollins | Apr. 25, 1925 |
| 2,357,301 | Bailey et al. | Sept. 5, 1944 |
| 2,357,302 | Kerr et al. | Sept. 5, 1944 |
| 2,357,303 | Kerr et al. | Sept. 5, 1944 |
| 2,361,681 | Gordon | Oct. 31, 1944 |
| 2,446,968 | Toner | Aug. 10, 1948 |
| 2,483,728 | Glaeser | Oct. 4, 1949 |
| 2,652,011 | Van Ramshorst | Sept. 15, 1953 |

FOREIGN PATENTS

| 1,025,395 | France | Jan. 21, 1953 |
| 627,759 | Germany | Mar. 23, 1936 |